(No Model.) 2 Sheets—Sheet 1.

D. COOPER.
STEAM ACTUATED VALVE.

No. 476,609. Patented June 7, 1892.

Witnesses:
Hamilton D. Turner
Alex. Barkoff

Inventor:
Dyer Cooper
by his Attorneys
Howson & Howson (No Model.) 2 Sheets—Sheet 2.

D. COOPER.
STEAM ACTUATED VALVE.

No. 476,609. Patented June 7, 1892.

Witnesses:
Hamilton D. Turner
Alex. Bartoff

Inventor:
Dyer Cooper
by his Attorneys
Howson & Howson

THE NORRIS PETERS CO., PHOTO-LITHO., WASHINGTON, D. C.

UNITED STATES PATENT OFFICE.

DYER COOPER, OF PHILADELPHIA, PENNSYLVANIA.

STEAM-ACTUATED VALVE.

SPECIFICATION forming part of Letters Patent No. 476,609, dated June 7, 1892.

Application filed February 23, 1892. Serial No. 422,518. (No model.)

*To all whom it may concern:*

Be it known that I, DYER COOPER, a citizen of the United States, residing in Philadelphia, Pennsylvania, have invented certain Improvements in Steam-Actuated Valves for Pumping-Engines, of which the following is a specification.

The object of my invention is to provide a valve of simple construction for controlling the admission and exit of steam to and from the cylinder of a pumping or other engine; and it comprises a cylindrical plunger adapted to cylindrical chambers, to which steam is admitted between the ends of the chambers and the end of the plunger, the plunger being moved at each stroke of the engine in such manner as to alternately open and close the exhaust-port of the chamber at one end of the plunger and permit the steam in the chamber at the opposite end to move the plunger and shift the controlling-valve to which said plunger is connected.

Figure 1:
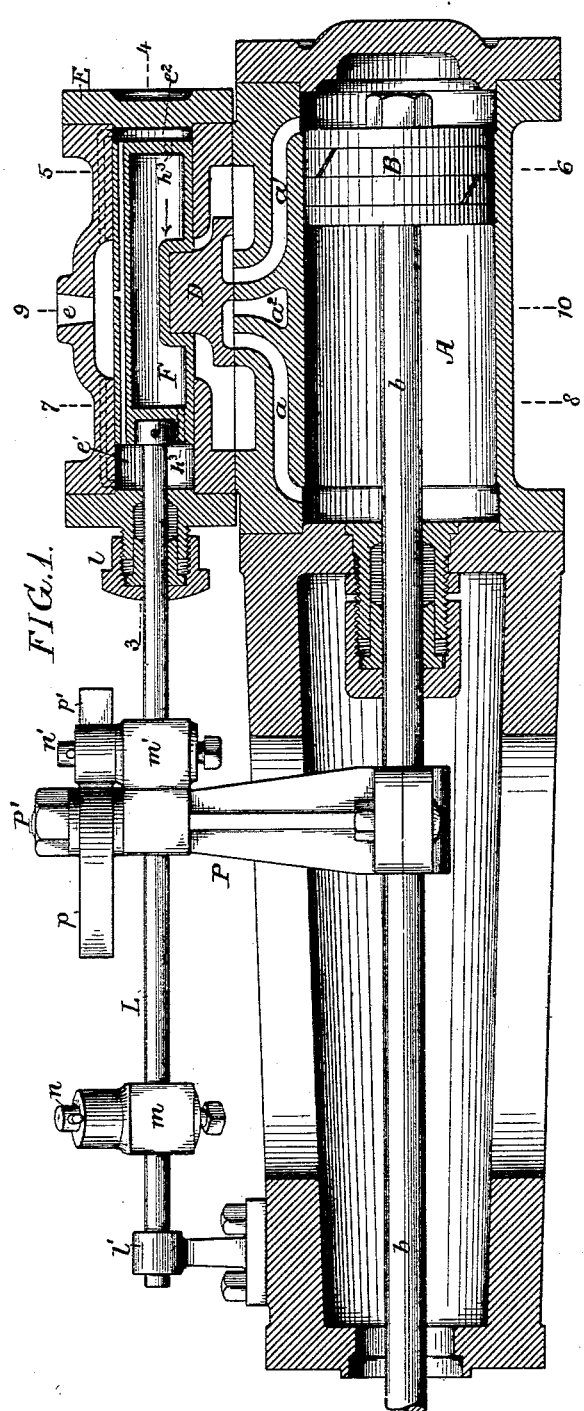
Figure 2:
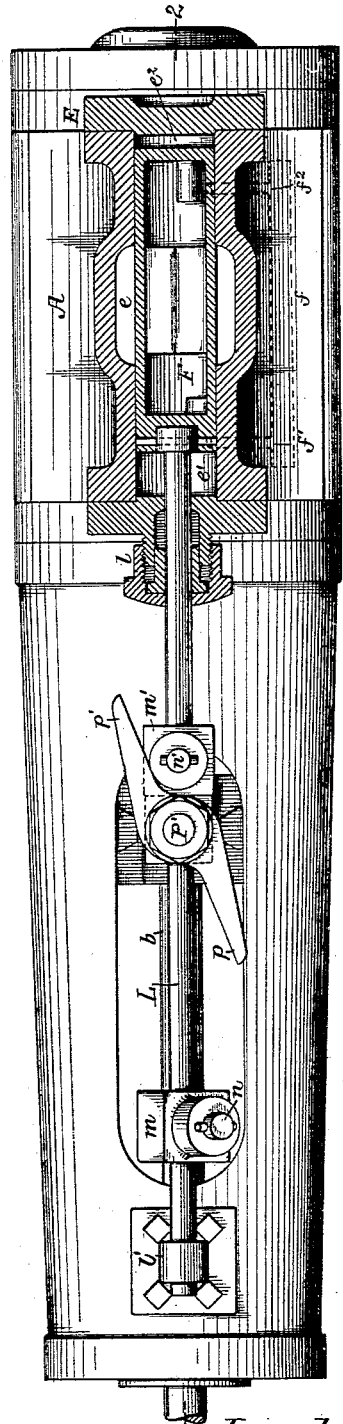
Figure 3:
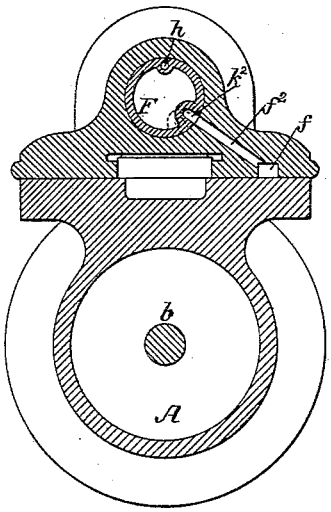
Figure 4:
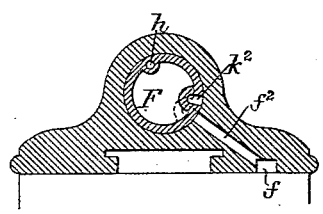
Figure 5:
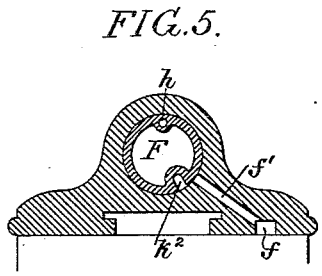
Figure 6:
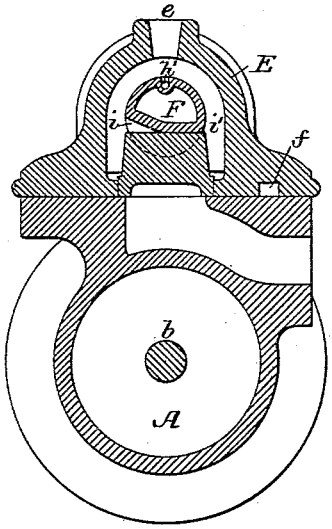
Figure 7:
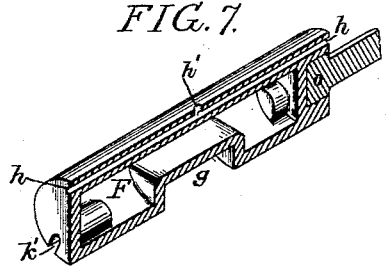

In the accompanying drawings, Figure 1 is a sectional view on the line 1 2, Fig. 2, of sufficient of a pumping-engine to illustrate my invention. Fig. 2 is a sectional plan view of the same on the line 3 4, Fig. 1. Fig. 3 is a transverse section on the line 5 6, Fig. 1. Fig. 4 is a similar view showing a different position of the plunger. Fig. 5 is a transverse section on the line 7 8, Fig. 1. Fig. 6 is a transverse section on the line 9 10, Fig. 1; and Fig. 7 is a sectional perspective view of the plunger and a portion of its rod.

Referring to the drawings, A represents the cylinder of an ordinary form of pumping-engine, having a piston B connected to a piston-rod $b$ and provided with the usual entrance-ports $a$ $a'$ and an escape-port $a^2$, the flow of steam through such ports being controlled by a double D-valve of ordinary construction.

E is a steam-chest provided with an entrance-port $e$ for the steam, which passes around the cylindrical plunger F and the valve D into the cylinder. The opposite ends of the steam-chest E are in the form of open-ended cylindrical chambers $e'$ $e^2$, from which lead escape-ports $f'$ $f^2$ to a longitudinal passage $f$, from whence the steam is conducted from the engine. Between the chambers $e'$ $e^2$ fits the cylindrical plunger F, its opposite ends being adapted to fit within the chambers, as shown, and, if necessary, packing-rings of any ordinary construction may be employed to keep the parts steam-tight.

The plunger F is cylindrical in form, but is provided with a recess $g$ at its central portion, within which fits the top of the slide-valve D, and the upper face of this recess is formed of two portions $i$ $i'$, inclined to each other, as shown in Fig. 6. The main body of the plunger is preferably hollow to reduce its weight, and in its upper portion is a steam-passage $h$ of comparatively small diameter, which extends from end to end of the plunger and has at about the center an opening $h'$, leading into the steam-chest, so that both of the chambers $e'$ $e^2$ are at all times open to the steam-supply; or, if desired, the steam-port may lead through the casing of the steam-chest, as shown by dotted lines in Fig. 1, or through ports in the opposite ends of the hollow plunger, as indicated at $h^3$ by dotted lines in Fig. 1.

On the lower surface of the cylindrical plungers are passages $k'$ $k^2$, one at each end of the plunger, but slightly out of line with each other, as shown by dotted lines in Fig. 3, these passages being open at one end into the chambers $e'$ $e^2$ and being adapted to be moved into line with their respective escape-ducts $f'$ $f^2$. From one end of the plunger extends a rod L, passing through a stuffing-box $l$ and having its opposite end guided in a standard $l'$. Secured to this rod are two blocks $m$ $m'$ at a distance from each other corresponding to the stroke of the engine, and mounted upon these blocks are anti-friction rollers $n$ $n'$, the position of the blocks and rollers being at an angle to each other, as illustrated in Figs. 1 and 2; or, if preferred, the anti-friction rollers may be under the rod L.

Secured to the piston-rod $b$ is a standard P, to which at a point either above or below the rod L is bolted a cam P', having opposite cam-faces $p$ $p'$, which operate, respectively, upon the rollers $n$ $n'$ as the piston B approaches the limits of its movement.

The operation of the device is as follows: Considering the apparatus to be in the position illustrated in the drawings, steam passing through the port $a'$ into the cylinder and the piston is starting on its forward movement, its rearward movement having been completed and the cam $p'$ having acted through the anti-friction roller $n'$ and the block $m'$ to turn the cylindrical plunger F on the rod L as an axis until the face $i'$ of the recessed portion of the plunger came into contact with the upper surface of the valve D, as shown in Fig. 6, the top of the valve D stopping its further movement. With the parts in the present position communication is open through the passage $k'$ between the chamber $e'$ and the exhaust-passage $f'$, permitting the escape of steam from the chamber $e'$, and the steam entering through the ports $h'$ and the passage $h$ passes to the chamber $e^2$, so that the steam will operate upon the cylindrical plunger and force it in the direction of the arrow, the steam in the chamber $e'$ escaping through the port $f'$, as previously described. This movement continues until the valve D has been shifted, opening communication between the entrance-port $a'$ and the exhaust-port $a^2$ and permitting the steam to enter through the passage $a$ into the opposite end of the cylinder. The steam, acting on the piston B, forces it forward until the cam-face $p$ of the cam $P'$ operates upon the roller $n$, and as the cylindrical plunger is completing its forward movement the action of the cam-face on the roller turns the plunger on its rod until the opposite face $i'$ of the recessed portion $g$ of the plunger comes into contact with the top of the slide-valve, closing the communication through the passage $k'$ and opening communication between the chamber $e^2$ and the escape-port $f^2$ through the passage or valve $k^2$. The movement of the parts is thus alternately reversed, and the action of the engine continues.

This construction of steam-valves is of course applicable to reciprocating engines of all classes.

Having thus described my invention, I claim and desire to secure by Letters Patent—

1. The combination of the steam-chest having open-ended cylindrical chambers in communication at all times with the steam-supply, a cylindrical plunger adapted to said chambers, said cylindrical plunger being recessed and fitting over a slide-valve, a slide-valve, exhaust-ports leading from said cylindrical chambers, and passages in said cylindrical plunger, with mechanism for oscillating said plunger, substantially as specified.

2. The combination, in a steam-engine, of the slide-valve, a steam-chest having opposite chambers $e'$ $e^2$ in communication at all times with the steam-supply, a cylindrical plunger adapted to said chambers and having a recess with inclined faces $i$ $i'$, to which the slide-valve is adapted, exhaust-ports leading from said cylindrical chambers, the cylinder A, its reciprocating piston, a piston-rod $b$, a standard secured to said rod, a double cam carried by said standard, a rod extending from said plunger to the standard, and blocks carried by said rod and adapted to be acted upon by said double cam, substantially as specified.

In testimony whereof I have signed my name to this specification in the presence of two subscribing witnesses.

DYER COOPER.

Witnesses:
JNO. E. PARKER,
EUGENE ELTERICH.